United States Patent [19]
Rives et al.

[11] Patent Number: 5,950,371
[45] Date of Patent: Sep. 14, 1999

[54] COLUMN MOUNTABLE SHELF FOR FURNITURE SYSTEMS

[75] Inventors: Eric C. Rives, Wyoming; Joyce S. Bromberg, Grand Rapids, both of Mich.

[73] Assignee: Steelcase Inc., Grand Rapids, Mich.

[21] Appl. No.: 08/871,094

[22] Filed: Jun. 6, 1997

[51] Int. Cl.[6] .................................................. E04B 2/74
[52] U.S. Cl. ........................... 52/36.6; 52/239; 52/741.1; 108/108; 108/110; 211/107; 248/220.42; 248/243; 403/252; 403/255
[58] Field of Search ................................... 52/36.4, 36.5, 52/36.6, 239, 741.1; 108/108, 110, 192, 193; 211/90.01, 90.02, 107; 248/220.42, 243; 403/252, 253, 254, 255

[56] References Cited

U.S. PATENT DOCUMENTS

| | | |
|---|---|---|
| D. 274,105 | 6/1984 | Brescia et al. . |
| D. 297,693 | 9/1988 | Norstedt . |
| D. 299,896 | 2/1989 | Harrell . |
| D. 309,687 | 8/1990 | Embree et al. . |
| D. 321,446 | 11/1991 | Liptak . |
| D. 337,719 | 7/1993 | Burns . |
| D. 341,624 | 11/1993 | Evenson et al. . |
| 2,191,701 | 2/1940 | Wood .................................. 248/243 X |
| 2,833,420 | 5/1958 | Streater . |
| 2,976,003 | 3/1961 | Foster ...................................... 248/243 |
| 3,199,822 | 8/1965 | Ruhnke .................................... 248/243 |
| 3,220,363 | 11/1965 | Gingher . |
| 3,281,102 | 10/1966 | Hobson ............................... 108/108 X |
| 3,478,993 | 11/1969 | Wyeroski et al. . |
| 3,479,974 | 11/1969 | Ferdinand et al. . |
| 3,481,286 | 12/1969 | La Mar et al. . |
| 3,614,044 | 10/1971 | Bard .................................... 248/243 X |
| 3,647,080 | 3/1972 | Denny ..................................... 211/191 |
| 4,716,841 | 1/1988 | Suttles . |
| 4,881,471 | 11/1989 | Schwartz et al. . |
| 4,881,708 | 11/1989 | Walter .................................... 248/243 |
| 5,156,096 | 10/1992 | Lamprey ............................. 108/108 X |
| 5,185,971 | 2/1993 | Johnson, Jr. . |
| 5,511,348 | 4/1996 | Cornell et al. ............................ 52/239 |

Primary Examiner—Carl D. Friedman
Assistant Examiner—Kevin D. Wilkens
Attorney, Agent, or Firm—Price, Heneveld, Cooper, DeWitt & Litton

[57] ABSTRACT

A furniture system for fitting-out a building room of the type having a generally open plan and having an associated floor surface includes an overhead framework including a plurality of horizontal beam segments interconnected to form a rigid structure configured to be spaced above the floor surface. A plurality of support columns, each has an upper portion connected with the overhead framework, and a lower portion shaped to abut the floor surface to support the overhead framework in a freestanding fashion at a predetermined elevation above average user height. Each of the support columns further includes at least three vertical edges defining substantially planar faces therebetween. At least two of the vertical edges have a plurality of slots therein for supporting office furniture items and office accessories. A shelf is mounted to one of the support columns and is supported thereon. The shelf includes a frame having a plurality of hooks engaged in the slots of at least two of the vertical edges of the column and a shelf top affixed to and supported by the frame.

11 Claims, 5 Drawing Sheets

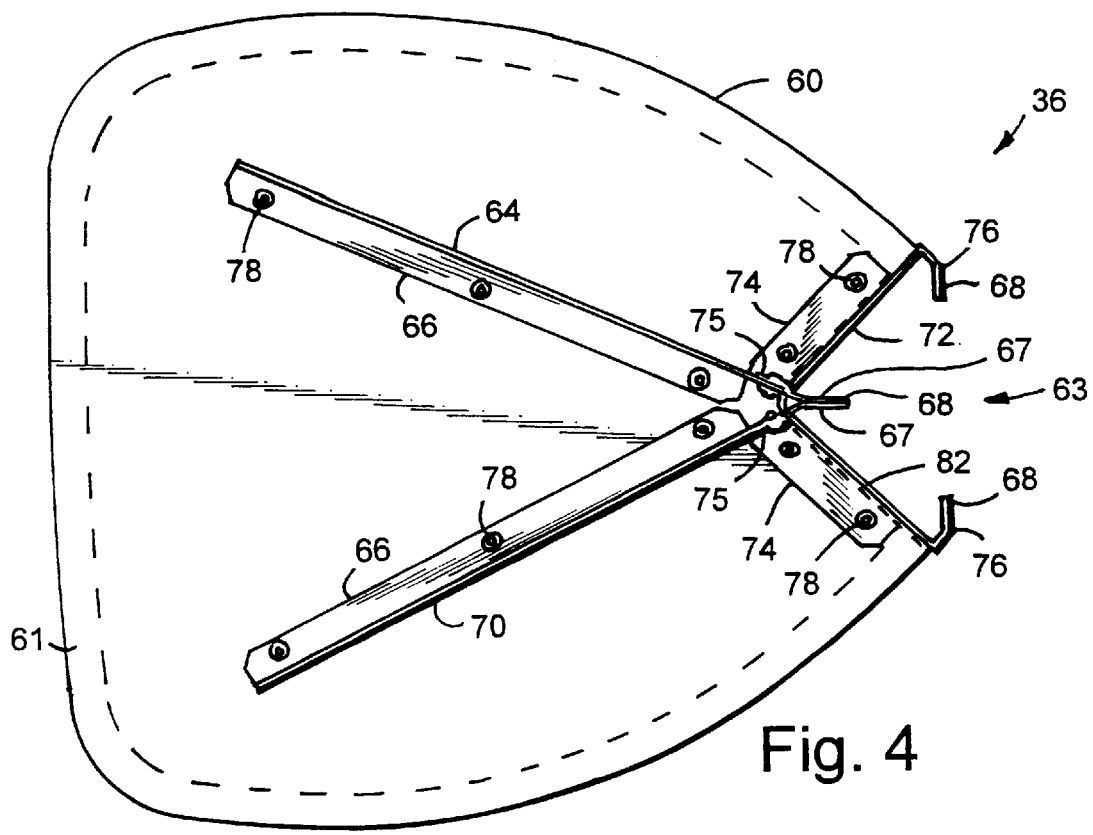
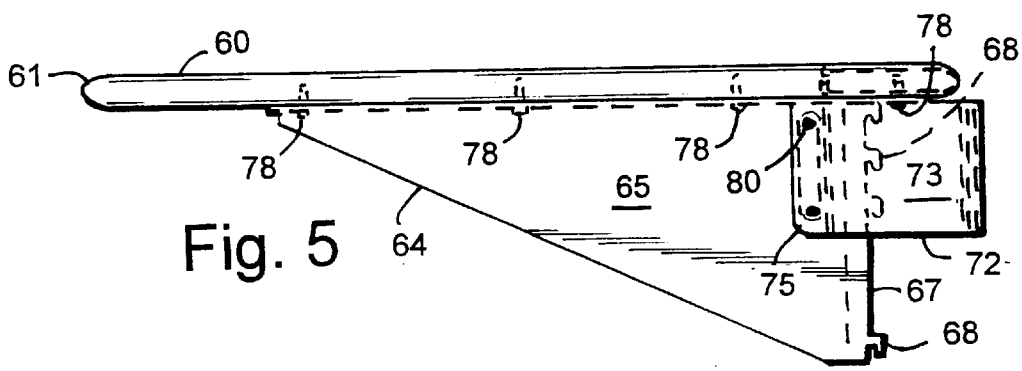
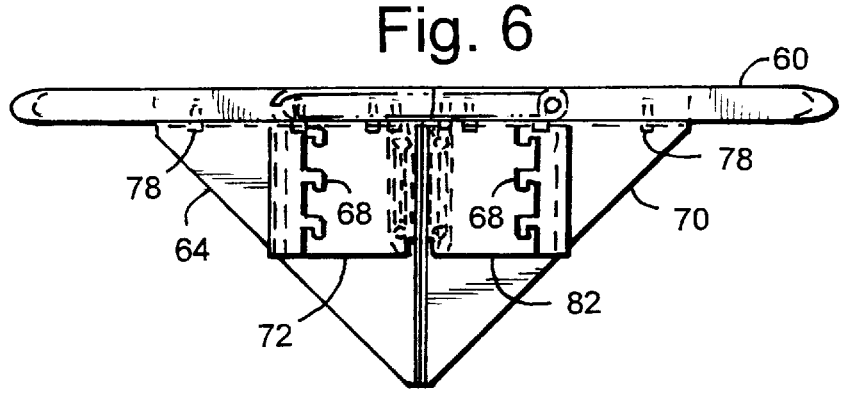

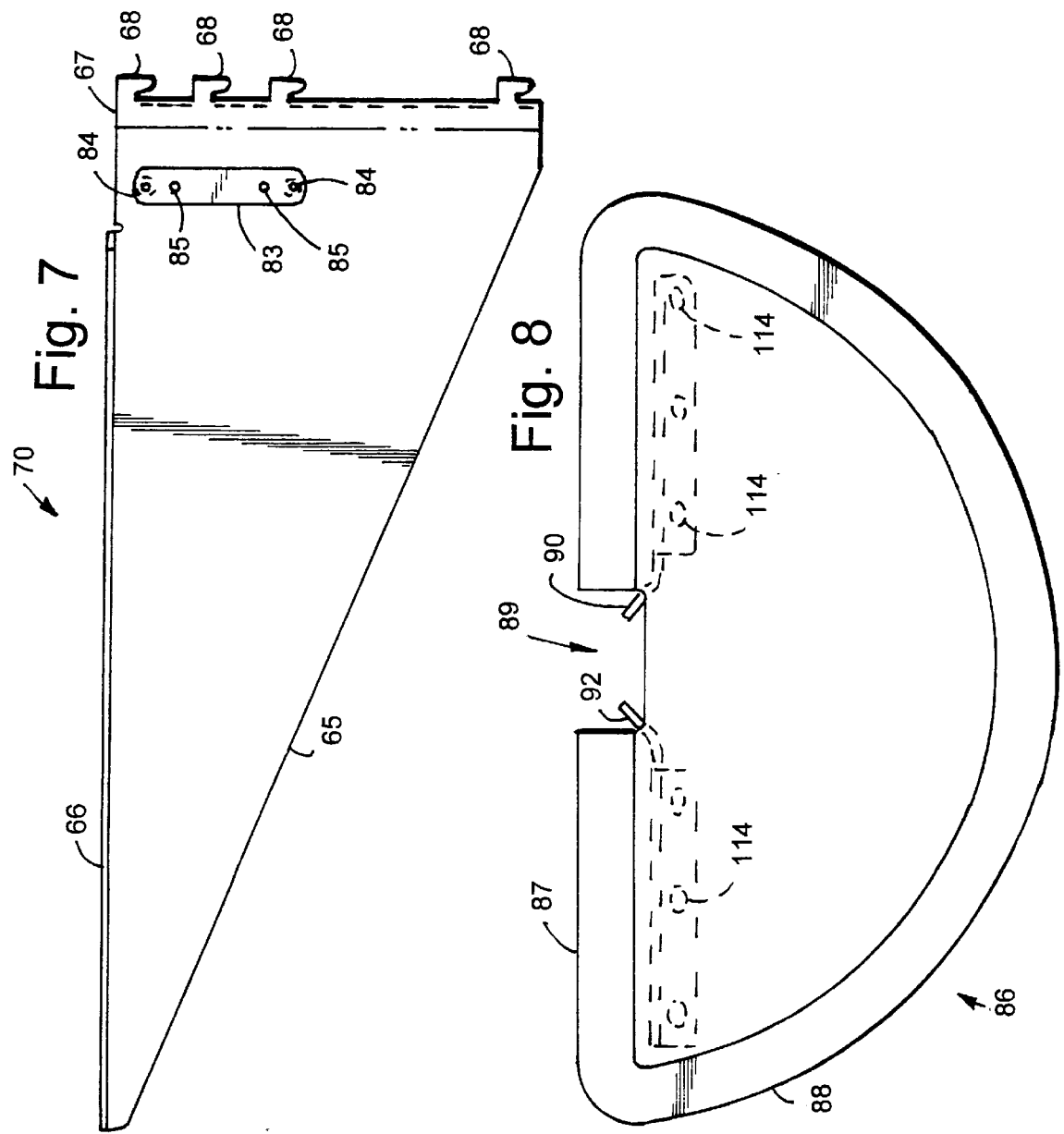

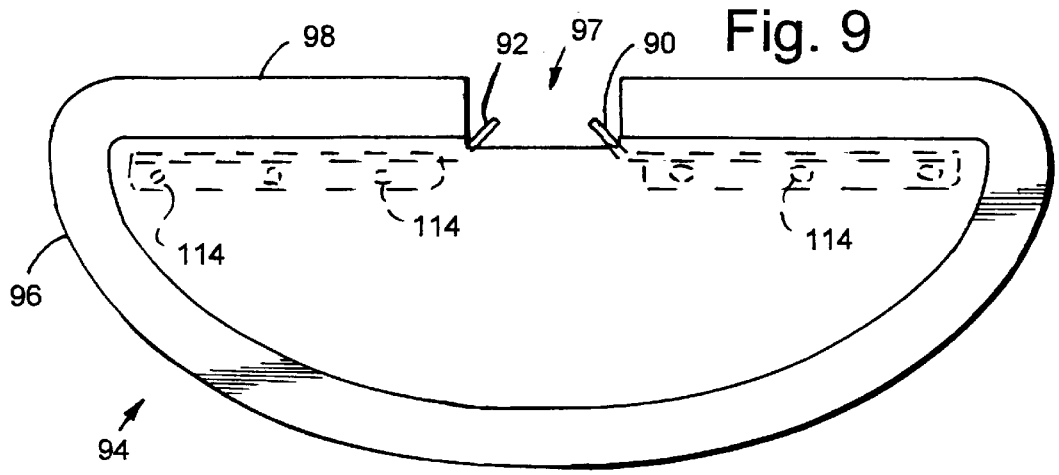
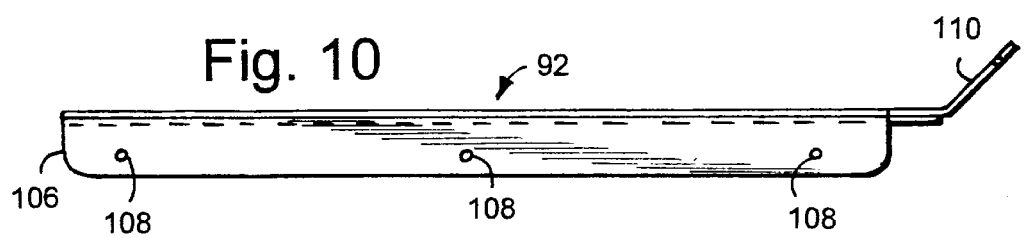
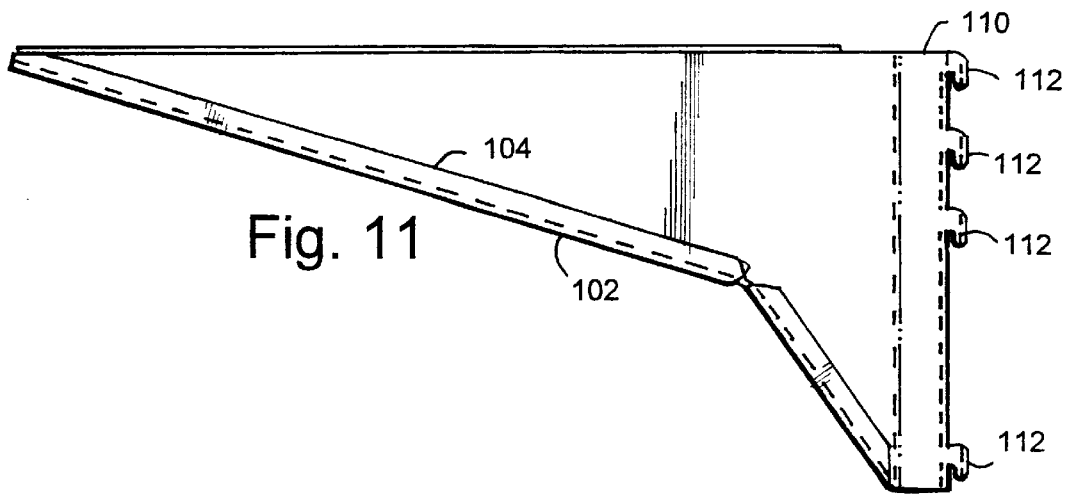

5,950,371

COLUMN MOUNTABLE SHELF FOR FURNITURE SYSTEMS

CROSS-REFERENCES TO RELATED APPLICATIONS

The present application is related to commonly assigned, copending U.S. patent application Ser. No. 08/621,164, filed Mar. 22, 1996, entitled FURNITURE SYSTEM, which is hereby incorporated herein by reference.

BACKGROUND OF THE INVENTION

The present invention relates to furnishings, and in particular, to accessories for furniture systems that are particularly adapted to support group activities in open plans, and the like.

Open office plans are well-known in the art, and generally comprise large, open floor spaces in a building that are furnished in a manner that is readily reconfigurable to accommodate the ever changing needs of a specific user, as well as the divergent requirements of different tenants. One arrangement typically used for furnishing open plans includes movable partition panels that are detachably interconnected to partition off the open space into individual workstations or offices. Some such partition panels are configured to receive hang-on furniture units, such as worksurfaces, overhead cabinets, shelves, etc., and are generally known in the office furniture industry as "systems furniture." Another arrangement for dividing or partitioning open plans includes modular furniture arrangements in which a plurality of differently shaped, freestanding furniture units are interconnected in side-by-side relationship, with upstanding privacy screens attached to at least some of the furniture units to create individual, distinct workstations or offices.

However, these types of conventional workstation arrangements are not particularly adapted to support workers engaged in group work, such as self-managing teams, or others involved in team problem solving techniques, wherein a relatively large number of workers from different disciplines, such as engineering, design, manufacturing, sales, marketing, purchasing, finance, etc., meet together as a group to define and review issues, set general policy, and then breakout into a number of smaller subgroups or individuals to resolve those specific problems relating to their particular discipline. Team projects typically have a rather specific objective and are of a limited duration, such that the individual workers are temporarily assigned to the group for the life of the project, and are then reassigned to a new group when the project is completed. Group work is steadily gaining importance as a way of improving productivity and time-to-market, thereby emphasizing the need to support such activities more efficiently and effectively.

Conventional conference rooms, meeting halls, and the like are no longer considered an efficient use of space in open plans environments. Such conventional rooms typically require financial and time investments to create and are relatively permanent. Consequently, the permanent or semi-permanent nature of such conference rooms or meeting halls do not conform to the flexibility and reconfigurability associated with the latest office systems used to furnish open office spaces. The reconfiguration of such spaces is quite messy, and very disruptive in conducting day-to-day business.

In order to gain increased efficiency in the use of expensive office real estate, highly paid knowledge workers are now being supported with modular furniture systems in open office settings, instead of conventional private offices. These work settings are equipped with various state-of-the-art utilities and facilities. These modular systems are readily reconfigurable to effectively meet the ever-changing needs of the user and provides distribution and control of utilities throughout the open office plan.

One such system providing the required utility distribution to an open office space is a support column and beam system generally configured as an overhead framework having a plurality of horizontal beam segments interconnected in an end-to-end fashion to form a rigid structure configured to be positioned above the floor surface. The interconnected beam segments are supported by a plurality of support columns or posts, each having an upper portion connected with the overhead framework and a lower portion abutting the floor surface. The support columns and beams have an interior support structure forming raceways for the routing and distribution of utilities throughout the column and beam system.

However, the aforementioned column and beam systems are inadequate in and of themselves to satisfy all of the needs of the team members when working in the open office area. These column and beam systems generally also incorporate various features including horizontal tracks or troughs associated with the overhead beams for the hanging or mounting of accessories and slots in the posts to receive hang-on accessories. There is a need for accessory items adapted to interface with and cooperate with the column and beam systems to further improve the efficiency of the team members and personalize the workspace as they work in the open areas of the office system.

SUMMARY OF THE INVENTION

The present invention relates to accessories mountable to a post and beam system, and in particular to a shelf which can be mounted to the post of a post and beam system.

One aspect of the present invention is a combined shelf and column and beam system for fitting-out a building room of the type having a generally open plan and having an associated floor surface. The combination comprises an overhead framework including a plurality of horizontal beam segments interconnected in an end-to-end fashion to form a rigid structure configured to be spaced above the floor surface. A plurality of support columns, each has an upper portion connected with the overhead framework, and a lower portion shaped to abut the floor surface to support the overhead framework in a freestanding fashion at a predetermined elevation above average user height. Each of the support columns further includes an interior support structure and at least three vertical edges defining substantially planar faces therebetween. At least two of the vertical edges have a plurality of slots therein for supporting office furniture items and office accessories. A shelf is mounted to one of the support columns and supported thereon. The shelf includes a frame having a plurality of hooks engaged in the slots of at least two of the vertical edges of the column and a shelf top affixed to and supported by the frame.

Another aspect of the present invention is a shelf for mounting to a support column of a support column and beam system and supported thereon wherein at least one column of the support column and beam system has a plurality of vertical edges, each edge having a plurality of regularly spaced slots in vertical alignment therealong. The shelf includes a frame having at least two vertical columns of a plurality of vertically aligned hooks. The hooks are vertically spaced at multiples of the regularly spaced slots in the support column, and the vertical columns of hooks are horizontally disposed one from the other a distance substantially equal to the horizontal displacement of the vertical edges of the support column. A shelf top is affixed to and supported by the frame.

Yet another aspect of the present invention is a method for mounting a shelf to a support column wherein the support column has a plurality of vertical edges and each of the edges has a plurality of regularly spaced vertical slots, the method comprises the steps of engaging hooks affixed to one end of a primary support into the slots of a first vertical edge of the support column at a desired vertical position along the support column. Next, the hooks affixed to one end of a first stabilizing support are engaged into the slots of a second of the vertical edges of the support column at a vertical position substantially identical to the primary support where the second vertical edge is adjacent to the first vertical edge. Next, a second end of the first stabilizing support is abutted to the primary support, and the second end of the first stabilizing support is fastened to the primary support. The following step comprises engaging hooks affixed to one end of a second stabilizing support into the slots of a third of the vertical edges of the support column at a vertical position substantially identical to the primary support where the third vertical edge is adjacent to the first vertical edge and is substantially opposite the second vertical edge. A second end of the second stabilizing support is then abutted to the primary support, and the second end of the second stabilizing support is fastened to the primary support. Finally, a shelf top is fastened to an upper portion of the first, the second, and the third supports.

These and other features, advantages and objects of the present invention will be further understood and appreciated by those skilled in the art by reference to the following specification, claims and appended drawings.

BRIEF DESCRIPTION OF THE DRAWINGS

FIG. 4 is a bottom view of the shelf showing the support brackets attached to an underside of the shelf top.

FIG. 5 is a right side view of the shelf shown in FIG. 4.

FIG. 6 is an end view of the shelf shown in FIG. 4, as viewed from the column attach area.

FIG. 7 is a side view of a primary support for supporting the shelf.

FIG. 8 is a top view of an alternate embodiment of the shelf having a semi-circular planform and wherein the mount brackets are positioned to engage two rows of vertical slots of the column.

FIG. 9 is an alternate embodiment of the shelf having a semi-elliptical planform and wherein the mount brackets are positioned to engage two of the rows of vertical slots in the column.

FIG. 10 is a top view of the mount bracket for supporting the shelves of FIGS. 8 and 9.

FIG. 11 is a side view of the mount bracket shown in FIG. 10.

DETAILED DESCRIPTION OF PREFERRED EMBODIMENT

Figure 2:
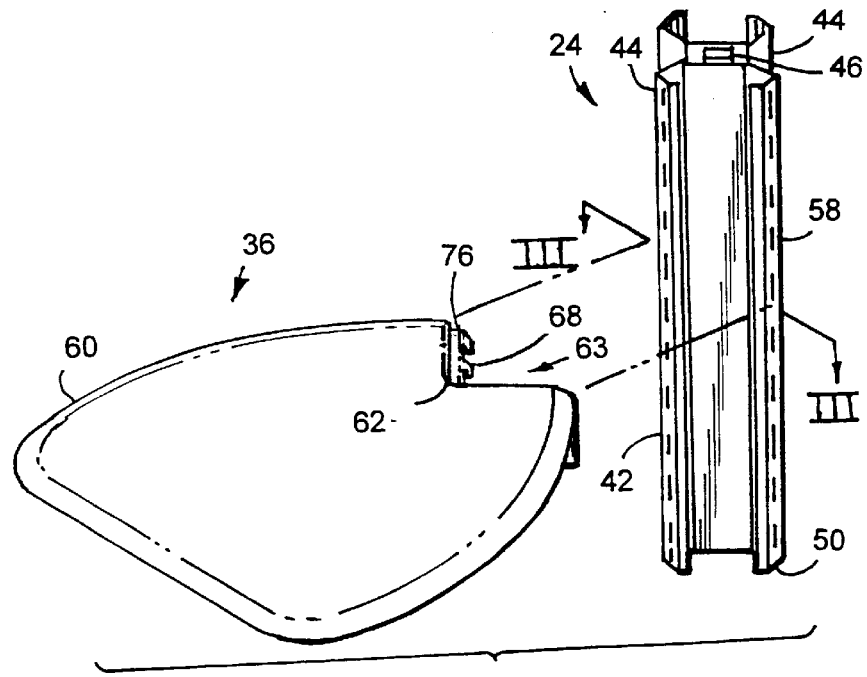
FIG. 2 is a partially exploded perspective view of a shelf according to the present invention and a segment of the column of a column and beam system showing the slots at the corners of the column.
Figure 3:
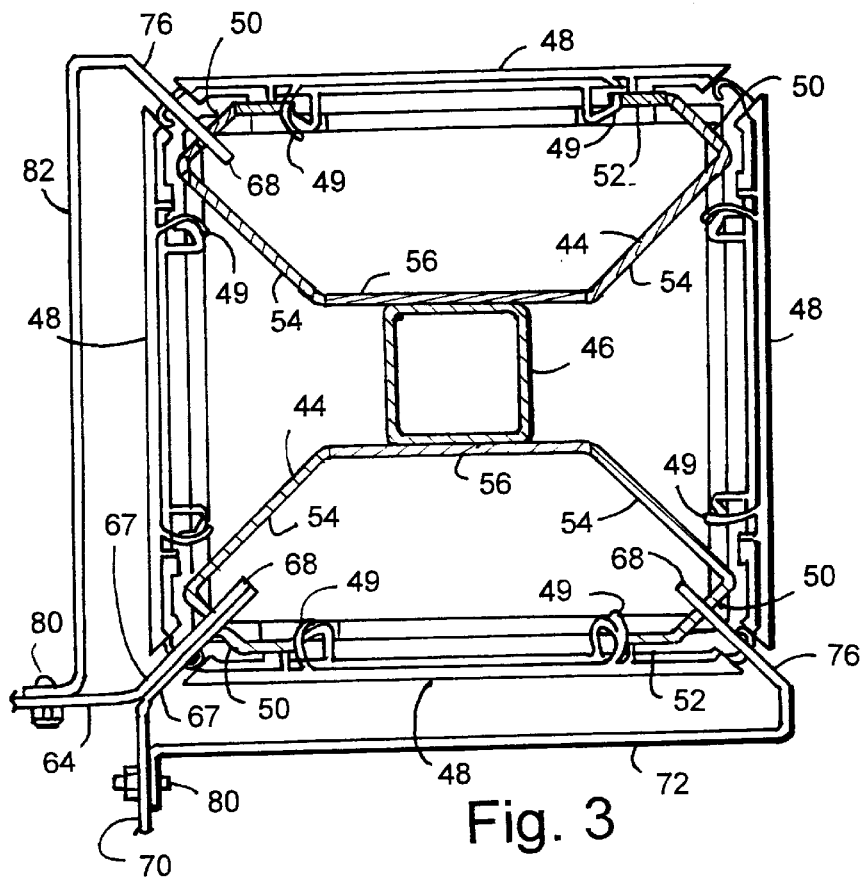
FIG. 3 is a cross section of the column segment shown in FIG. 1, wherein the support brackets of the shelf are shown engaged within the vertical slots at the column edges.

For purposes of description herein, the terms "upper," "lower," "right," "left," "rear," "front," "vertical," "horizontal," and derivatives thereof shall relate to the invention as oriented in FIGS. 2 and 3. However, it is to be understood that the invention may assume various orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
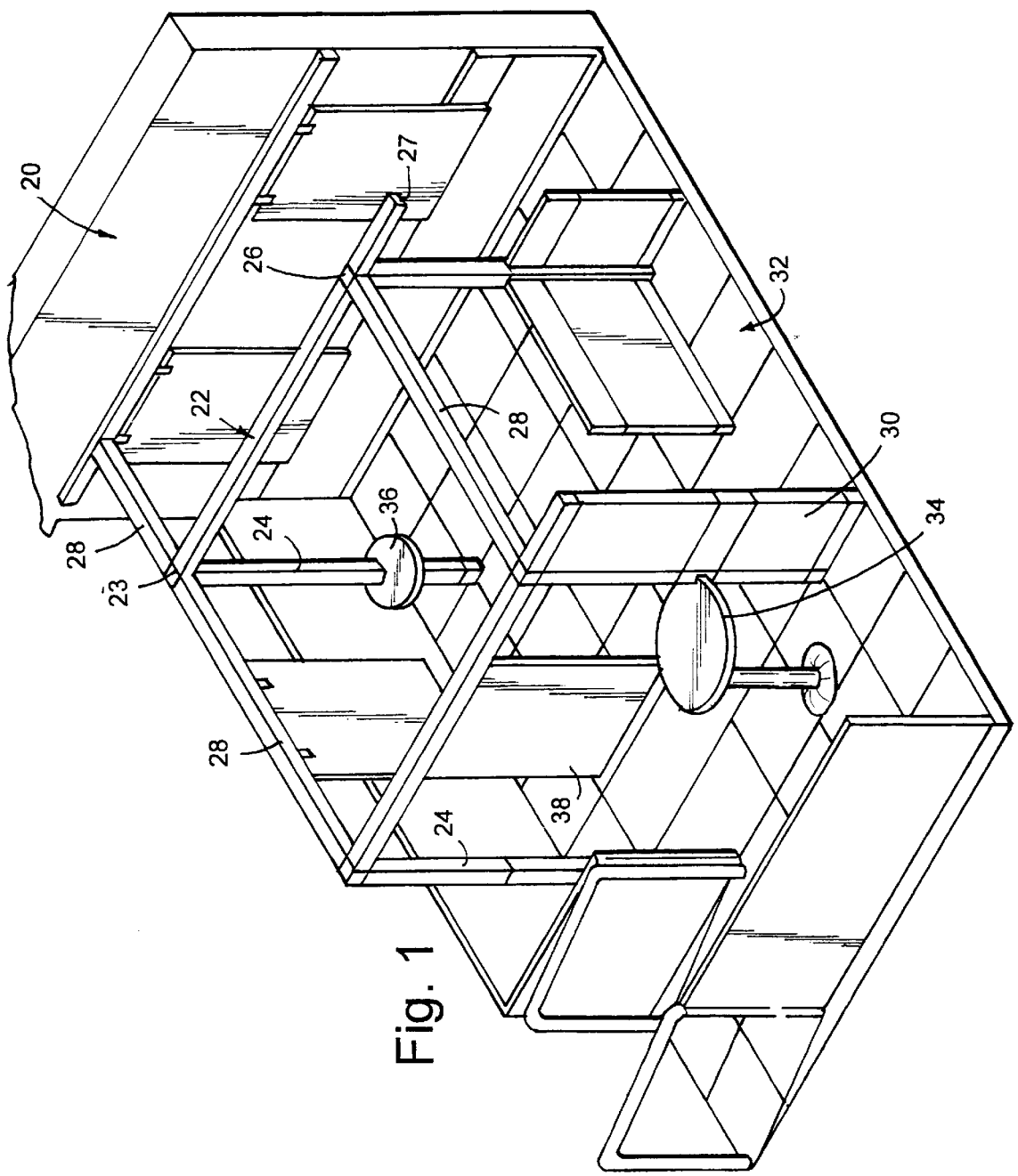
FIG. 1 is a perspective view of a column and beam system in an open office area showing at least one shelf embodying the present invention mounted to a column of the column and beam system.

Turning to the drawings, FIG. 1 shows an open area building room 20 having a prefabricated low raised floor system 32 supported directly on the floor of building room 20. Raised floor system 32 has a hollow interior with optional raceways (not shown) therethrough in which utilities are routed to their desired locations. A column and beam system 22, also known as a spaceframe system, supports group and team activities and the like, and includes utility raceways for the distribution of office utilities for access by the users in room area 20. Spaceframe system 22 in one application can support group work activities in open building room 20. Spaceframe system 22 is typically compatible with and can be fully integrated in both function and appearance with related and complimentary wall systems (not shown). Spaceframe system 22 may be used as a stand alone application in open plans and it may also be used as a "front-porch" application wherein components of spaceframe 22 are used together with enclosed or open offices embodying related wall systems.

Spaceframe system 22 in the illustrated example includes an overhead framework 23, comprising a plurality of beam segments 28 interconnected in an end-to-end fashion to form a rigid structure configured to be positioned above the surface of raised floor 32. Spaceframe system 22 also includes a plurality of overhead support columns or posts 24, each having an upper portion thereof connected with overhead framework 23, and a lower portion thereof shaped to abut the surface of prefabricated floor system 32. It is to be understood that spaceframe system 22 can also be supported directly on the floor surface of building room 20. In any event, posts 24 can support framework 23 in a freestanding fashion within building room 20 at a predetermined elevation. Spaceframe system 22 includes a plurality of individual panels 38 which have a lightweight construction to permit easy, manual, bodily translation of the same by an adult user and can also include partition panels 30 which are attached to posts 24 to form walls or office partitions. The panels 38 are mounted on overhead framework 23 at various locations therealong in a manner in which panels 38 hang downwardly from overhead support framework 82 in a generally vertical orientation, and are readily and easily manually removable therefrom and reconfigurable by the user. The horizontal beam segments 28 of framework 23, as well as posts 24, include utility raceways 26 and 27 associated therewith to facilitate the distribution of utilities to the associated work area. In one example of spaceframe system 22, beam segments 28 and posts 24 have substantially hollow constructions, forming raceways 26 and 27 therein, which are divided to physically separate power and communication/data wires. In the example illustrated in FIG. 1, spaceframe system 22 is positioned directly on top of prefabricated floor system 32. Posts 24 are also adapted to support accessories such as table 34 and shelf 36 to aid the using workers.

Referring now to FIG. 2, a shelf 36 is shown with respect to a segment 42 of post 24. One construction of post 24 comprises oppositely facing channels 44 which are maintained in a back-to-back spaced relationship by central tube 46. Each of channels 44 has a generally C-shaped cross section as visible in FIGS. 2 and 3. Each channel 44 has a floor 56 with webs 54 bent up at substantially a 45° angle with diagonal faces 50 formed at substantially a right angle to web 54. Each of diagonal faces 50 has a plurality of regularly spaced vertical slots 58 therealong such that when channels 44 are abutted to opposite sides of central tube 46, the extended axes of slots 58 define the diagonal axes of the square planform of post 24. Regularly spaced slots 58 function to support accessories desired to be attached to post 24. Post 24 typically has a plurality of decorative covers 48 which enclose and define the periphery of post 24. Decorative covers 48 are generally formed of a resinous material and have appendages 49 which engage a portion of the post structure such as lips 52 of channels 44 to maintain covers 48 in a desired fixed relationship to the structure of post 24.

Shelf 36 is affixed to post 24 in such a manner wherein hooks 68 of shelf 36 engage slots 58 to maintain shelf 36 at a desired position along post 24.

As shown in FIG. 2, shelf 36 has a shelf top 60 of a desired planform which may be of any desired geometrical configuration. In the preferred embodiment, shelf top 60 has a generally tear-drop shaped planform with a flat base and includes V-shaped notch 63 at an end opposite the flat base. Notch 63 is sized to receive a corner portion of post 24.

Turning now to FIGS. 4–6, shelf 36 in its preferred embodiment is shown with shelf top 60 having a rounded or bullet-nosed edge 61 about its periphery and V-shaped notch 63 at one end thereof. A plurality of brackets are attached to the bottom of shelf top 60. Right and left primary support brackets 64 and 70 typically comprise a vertical triangular web 65 having a horizontal flange 66 at a top edge thereof for mating with the bottom surface of shelf top 60 and also have at one end support flange 67 upon which are located hooks 68. Hooks 68 are spaced at multiples of the spacing of slots 58 in post 24 (FIG. 2). Left primary support 70 is a mirror image of right primary support 64 such that when support flanges 67 are abutted one to the other and substantially positioned at apex 62 of notch 63, supports 64 and 70 form a "Y" with webs 65 forming the legs of the Y and abutted support flanges 67 forming the stem thereof.

Stabilizing supports 72 and 82 have a vertical web 73 which is substantially coplanar with the edges of notch 63 in shelf top 60. Web 73 has a horizontal flange 74 at an upper edge for attaching to the lower surface of shelf top 60 and at one end an abutting flange 75 for attachment to web 65 of primary supports 64 and 70. At an opposite end of vertical web 73 is a lateral flange 76 having a plurality of hooks 68 at an end thereof. Hooks 68 are spaced at multiples of the spacing of slots 58 in post 24 (FIG. 2). Left stabilizing support 82 is a mirror image of right stabilizing support 72 such that when attached to shelf top 60 and primary supports 64 and 70, lateral flanges 76 are in substantially opposing alignment and define a plane which is at substantially a right angle to the plane defined by support flanges 67. The orientation of the planes defined by flanges 76 and 67 substantially coincide with the planes defined by the extended axes of regularly spaced slots 58 at the corner edges of post 24.

Referring now to FIGS. 3 and 4, shelf 36 can be securely mounted to post 24 by abutting support flanges 67 of right and left primary supports 64 and 70 to form a "Y" and by then engaging abutted hooks 68 into slots 58 at a desired vertical position on post 24. Slots 58 are of sufficient width to accommodate the back-to-back abutting relationship of support flanges 67. Stabilizing supports 72 and 82 are vertically positioned such that horizontal flanges 74 are substantially coplanar with horizontal flanges 66 of primary supports 64 and 70. Next, hooks 68 of right and left stabilizing supports 72 and 82 are engaged in slots 58 of the vertical edges of post 24 adjacent primary supports 64 and 70. Abutting flanges 75 of stabilizing supports 72 and 82 are abutted to and fastened to webs 65 of primary supports 64 and 70, respectively, using fasteners 80. The interrelationship of primary supports 64 and 70 with stabilizing supports 72 and 82 are such that the resulting assembled framework is substantially rigidly attached to post 24 and can only be dislodged or removed from post 24 by the disassembly of supports 64, 70, 72, and 82. Shelf top 60 is placed upon horizontal flanges 66 and 74 of the assembled framework and is attached thereto with fasteners 78 which in the preferred embodiment are threaded screws.

FIG. 7 illustrates left primary support 70 which further includes a threaded mount plate 83 attached to vertical triangular web 65. Threaded mount plate 83 has a threaded hole 84 at each end thereof and is attached to vertical triangular web 65 with fasteners 85, which in the preferred embodiment are rivets. Threaded holes 84 positionally correspond to the fastener 80 locations for attaching abutting flange 75 of left stabilizing support 82. Threaded mount plate 83 provides a pre-attached threaded receptacle for fasteners 80 thereby eliminating the need for a separate nut. Right primary support 64 can also include a like mount plate 83 for the attachment of right stabilizing support 72.

FIG. 8 illustrates shelf 86 which is an alternate shelf embodiment for attachment to post 24. Shelf 86 comprises a shelf top 88 which is semi-circular in planform and has a flat linear edge 87. A rectilinear notch 89 is located substantially at a midpoint of flat linear edge 87 and is large enough to receive post 24 therein. Semi-circular shelf 86 also includes right and left shelf supports 90 and 92 for engaging slots 58 in post 24.

Left shelf support 92 is further illustrated in FIGS. 10 and 11 whereby support 92 comprises a vertical triangular web 102 which has a lower folded edge 104 for increased rigidity and to present a smooth edge to reduce the possibility of a user incurring an injury from a sharp edge on the support. A horizontal flange 106 is located along an upper edge of support 92 for attaching to a bottom surface of shelf top 88. A support flange 110 is located at one end of web 102 and is bent out of the plane of web 102. A plurality of hooks 112 are located at the free edge of support flange 110. Hooks 112 are sized and spaced to facilitate engagement with slots 58 at the corners of post 24. Right shelf support 90 is mirror image of left shelf support 92.

To mount semi-circular shelf 86 on post 24, one each of supports 90 and 92 are mounted to post 24 by engaging hooks 112 in slots 58 at the vertical position desired for shelf 86. Supports 90 and 92 are positioned such that triangular webs 102 of each support diverge one from the other when hooks 112 are engaged in slots 58 of post 24. Shelf top 88 is placed upon horizontal flanges 106 such that post 24 is received in notch 89. Fasteners 114 are inserted through holes 108 in horizontal flange 106 to affix shelf top 88 to supports 90 and 92. Shelf 86 now cannot be removed from post 24 unless fasteners 114 are removed to disassemble shelf top 88 from supports 90 and 92. The nonparallel nature of support flanges 110 of supports 90 and 92 in assembled shelf 86 prevent removal of shelf 86 from post 24 without disassembling shelf 86.

FIG. 9 illustrates semi-elliptical shelf 94 which is another alternate shelf embodiment. Semi-elliptical shelf 94 has a shelf top 96 which has a flat linear edge 98 which substantially corresponds to a major axis of the semi-elliptical planform and a rectilinear notch at substantially a midpoint of edge 98 for receiving a portion of post 24. Semi-elliptical shelf 94 is mounted to post 24 utilizing right and left support brackets 90 and 92 to support shelf top 96 in a manner identical to that of mounting semi-circular shelf 86 to post 24 as described above.

In the foregoing description, it will be readily appreciated by those skilled in the art that modifications may be made to the invention without departing from the concepts disclosed herein. Such modifications are to be considered as included in the following claims, unless these claims expressly state otherwise.

The embodiments of the invention in which an exclusive property or privilege is claimed are defined as follows:

1. A furniture system for fitting-out a building room of the type having a generally open plan and having an associated floor surface, comprising:

an overhead framework comprising a plurality of horizontal beam segments interconnected to form a rigid structure configured to be spaced above the floor surface;

a plurality of support columns, each having an upper portion connected with said overhead framework, and a lower portion shaped to abut the floor surface and thereby support said overhead framework in a free-standing fashion at a predetermined elevation above average user height, each of said support columns further comprising at least three vertical edges defining substantially planar faces therebetween, of which at least two of said vertical edges have a plurality of slots therein for supporting office furniture accessories; and a shelf mounted to one of said support columns and supported thereon, said shelf comprising a frame having a plurality of hooks engaged in said slots of at least two of said vertical edges of said column, and a shelf top affixed to and supported by said frame, wherein said frame further comprises:

at least one primary support having a plurality of hooks at one end thereof wherein said hooks are engaged in said slots of a first vertical edge of said support column; and two stabilizing supports, each of said stabilizing supports having a plurality of hooks at one end thereof and an abutting end at an opposite end thereof, wherein said hooks of a first and a second of said two stabilizing supports are engaged in said slots of a second and a third vertical edge of said support column respectively, each of said second and said third vertical edges of said support column being opposite one from the other, and each of said second and said third vertical edges being adjacent to said first vertical edge, and further wherein each of said abutting ends of said first and said second stabilizing supports abut and are affixed to said at least one primary support such that said frame is removable from said column only when said stabilizing supports are disassembled from said at least one primary support.

2. The furniture system according to claim 1 wherein said at least one primary support comprises a first primary support and a second primary support, each of said primary supports having a plurality of hooks at one end thereof wherein said hooks of said first primary support are abutted to said hooks of said second primary support and said abutted hooks are engaged in said slots of said first vertical edge of said support column.

3. The furniture system according to claim 2 wherein said top has a substantially tear-drop shaped planform with a flat base.

4. The furniture system according to claim 3 wherein said top further includes a notch at an apex of said tear-drop planform, wherein said notch receives at least a portion of said support column.

5. The furniture system according to claim 4 wherein said notch has a V-shape.

6. A shelf for mounting to a furniture support column of the type having a plurality of vertical edges, wherein each edge has a plurality of regularly spaced slots in vertical alignment therealong, said shelf comprising:

a frame having at least two vertical columns of a plurality of vertically aligned, regularly spaced hooks, said at least two vertical columns of said hooks horizontally disposed one from the other for engaging the vertical edges of the support column, wherein said frame includes at least one primary support having a plurality of hooks at one end thereof wherein said hooks are arranged to engage a set of regularly spaced slots in a first edge of the support column and two stabilizing supports, each of said stabilizing supports having a plurality of hooks at one end thereof and an abutting end at an opposite end thereof, wherein said hooks of a first and a second of said two stabilizing supports are arranged to engage like sets of regularly spaced slots in second and third edges of the support column respectively; and a shelf top affixed to and supported by said frame.

7. The shelf according to claim 6 wherein said at least one primary support comprises a first primary support and a second primary support, each of said primary supports having a plurality of hooks at one end thereof wherein said hooks of said first primary support are abutted to said hooks of said second primary support and said abutted hooks are arranged to engage the slots of the first vertical edge of the support column.

8. The shelf according to claim 7 wherein said top has a substantially tear-drop shaped planform with a flat base.

9. The shelf according to claim 8 wherein said top further includes a notch at an apex of said tear-drop planform, wherein said notch receives at least a portion of said support column.

10. The shelf according to claim 9 said notch has a V-shape.

11. A method for mounting a shelf to a furniture support column of the type having a plurality of vertical edges and wherein each of the edges has a plurality of regularly spaced vertical slots, the method comprising the steps of:

engaging hooks affixed to one end of a primary support into the slots of a first of the vertical edges of the support column at a desired vertical position along the support column;

engaging hooks affixed to one end of a first stabilizing support into the slots of a second of the vertical edges of the support column at a vertical position substantially identical to the primary support, said second vertical edge adjacent to the first vertical edge;

abutting a second end of the first stabilizing support to the primary support;

fastening the second end of the first stabilizing support to the primary support;

engaging hooks affixed to one end of a second stabilizing support into the slots of a third of the vertical edges of the support column at a vertical position substantially identical to the primary support, the third vertical edge adjacent to the first vertical edge and substantially opposite the second vertical edge;

abutting a second end of the second stabilizing support to the primary support;

fastening the second end of the second stabilizing support to the primary support; and fastening a shelf top to an upper portion of the first, the second, and the third supports.

* * * * *

UNITED STATES PATENT AND TRADEMARK OFFICE
CERTIFICATE OF CORRECTION

PATENT NO. : 5,950,371
DATED : September 14, 1999
INVENTOR(S) : Eric C. Rivers et al.

It is certified that error appears in the above-identified patent and that said Letters Patent is hereby corrected as shown below:

Col. 4, line 36;
"complimentary" should be --complementary--;

Col. 8, claim 10, line 60;
After "claim 9" insert --wherein--.

Signed and Sealed this

Sixth Day of June, 2000

Attest:

Q. TODD DICKINSON

Attesting Officer

Director of Patents and Trademarks